Aug. 18, 1964 J. D. OWEN 3,145,266

A.C. STATIC SWITCHING CIRCUITS

Filed June 29, 1961 2 Sheets-Sheet 1

INVENTOR.
JACK D. OWEN,

BY [signature]

HIS ATTORNEY

Aug. 18, 1964 J. D. OWEN 3,145,266

A.C. STATIC SWITCHING CIRCUITS

Filed June 29, 1961 2 Sheets-Sheet 2

INVENTOR.
JACK D. OWEN,
BY J. David Blumenfeld
HIS ATTORNEY 3,145,266
Patented Aug. 18, 1964

3,145,266

A.C. STATIC SWITCHING CIRCUITS

Jack D. Owen, Lynchburg, Va., assignor to General Electric Company, a corporation of New York Filed June 29, 1961, Ser. No. 120,760
10 Claims. (Cl. 179—84)

This invention relates to a static switching circuit arrangement, and more particularly to an A.C. static switch adaptable for use in carrier communication systems.

In carrier applications, such as multiplex carrier communications or carrier telephony, for example, it is conventional to have a plurality of user stations connected to a common transmission medium. Each of the user stations customarily includes a telephone to permit transmission of intelligence between the various stations over the common medium and the multiplex system. To permit any given station to communicate with any other station, a means must be provided for signaling between the calling and the called stations and to produce some perceptible indication of this fact at the called station. The apparatus for accomplishing this result is customarily referred to as an "A.C. ringdown unit" or as a "ringing circuit." In a conventional ringdown unit, a ringing generator provides an alternating or "ringing" signal which actuates an electromechanical "ringer" at the called station to indicate that another station is calling. The ringing current is applied to the common transmission medium in the form of a predetermined code pattern which identifies the particular station being called and may be any desired combination of spaced "long" and "short" ringing pulses.

The ringing signal is impressed in coded form on the common transmission medium by means of switching devices which are actuated in response to coded calling signals to pulse the output of the ringing generator. Hitherto such switches have generally been devices such as relays, saturable reactors, etc. While these have been satisfactory for many uses, and in various environments, they have drawbacks which seriously circumscribe their utility. For example, electromechanical relays contain moving elements and are, therefore, bulky, expensive to maintain, noisy, slow in operation and must be replaced on a regular basis. Saturable reactor devices, on the other hand, while avoiding many of the shortcomings of electromechanical relays, are beset by other problems which limit their usefulness, i.e., they are also bulky, complex in design, expensive, and have very stringent filtering requirements.

It is, accordingly, an object of this invention to provide an improved controlled static switching device.

Another object of this invention is to provide a static switch for switching and controlling a ringing current for use in carrier applications.

Still another object of the invention is to provide a static switching device which is of simple design, easy to manufacture, of high reliability, and simple to fabricate.

Other objects and advantages of the invention will become apparent as the description thereof proceeds.

Generally speaking, and in accordance with one aspect of the invention, the static switch, which is connected in series with an A.C. supply source, includes a pair of oppositely poled unidirectional conducting diode elements, a pair of capacitors and a load to be energized from the supply source. The first few cycles of the supply voltage charge the capacitors to a polarity such that the diodes are biased into the nonconducting state to prevent passage of the supply voltage to the load. By providing an additional conductive path, which may be externally controlled, the biasing is removed and the voltage applied to the load. In this fashion, the static switch may be opened and closed in response to an external coded call signal thereby selectively connecting the output from a ringing generator to the common transmission line.

The features of this invention which are believed to be characteristic are set forth with particularity in the appended claims. The invention itself, however, together with further objects and advantages thereof, may best be understood by reference to the following description, taken in connection with the accompanying drawings, in which:

Figure 1:
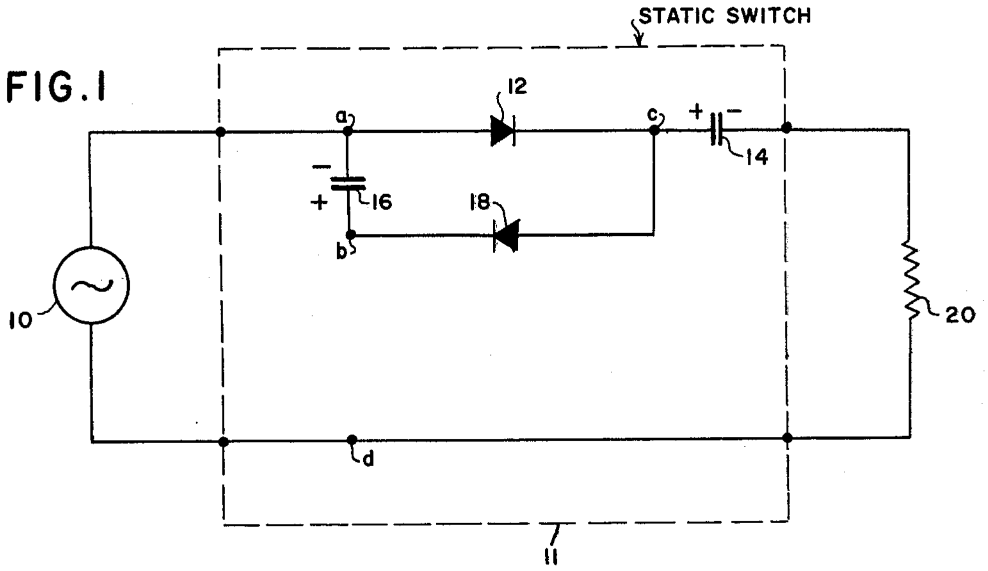
FIG. 1 is a schematic circuit diagram of the basic switch arrangement of the invention.

FIG. 1 illustrates one form of a static switch constructed in accordance with the principles of the invention and includes a source of alternating current supply voltage 10 which is to be applied to a load 20 through the static switch shown generally at 11. Static switch 11 includes a diode 12 poled in the forward direction of current flow so that it is in the conducting state during positive half cycles of the sinusoidal supply voltage. A shunt path around diode 12 is provided by the series combination of capacitor 16 and diode 18. Diode 18 is poled in the reverse direction of current flow and is, therefore, in the conducting state during negative half cycles of the supply voltage. A capacitor 14 is connected in series between load 20 and the junction of diodes 12 and 18.

Capacitors 14 and 16 have a dual function as they are both coupling capacitors for the alternating current supply voltage and provide switching bias for diodes 12 and 18. That is, during the first few cycles of the supply voltage capacitor 16 charges up to the peak-to-peak value of the supply voltage with the polarity indicated by the plus (+) and minus (−) signs. Capacitor 14 charges up to roughly one-half of this value with the polarity indicated by the plus (+) and minus (−) signs. These voltages bias diodes 12 and 18 to the nonconducting state and prevent passage of the supply voltage from source 10 to load 20.

In order to permit the selective application of the supply voltage to the load, a means must be provided to overcome the biasing voltage. To this end, either a path for discharging biasing capacitor 16 must be provided or capacitors 16 and diodes 12 and 18 must be bypassed entirely. The conductive paths may be manually controlled, as by a variable resistance element, or automatically controlled by such devices as transistors, controlled rectifiers, etc., to permit passage of the supply voltage during selected intervals. The latter are, of course, preferable where the switch is to be selectively actuated in response to control signals from a remote station as would be the case with calling signals for a "ringdown" application.

Figure 2:
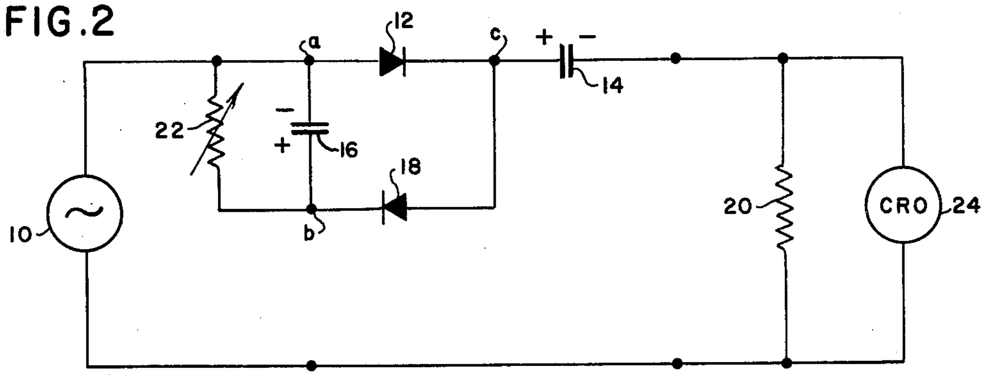
FIG. 2 is a modification of the arrangement of FIG. 1 including further a control element for opening and closing the switch.

FIG. 2 illustrates, schematically, a static switch which provides the desired conducting path for discharging the biasing capacitors. A variable resistance 22 is connected in shunt with capacitor 16 and a cathode ray oscilloscope is connected across load 20. Otherwise, FIGS. 1 and 2 are identical and the same numerals have, therefore, been utilized for corresponding elements. It can be seen that resistance 22 provides a discharge path for capacitors 14 and 16 and that the magnitude of the resistance controls the R-C time constant of the circuit. Hence, as will be described in detail later with reference to FIG. 3, the magnitude and wave form of the voltage developed across load 20 depends upon the magnitude of the shunting resistance 22. Since FIG. 2 is otherwise identical to the switch illustrated in FIG. 1, there is no need to repeat the detailed description of the circuit configuration and the manner of interconnecting the various components.

Figure 3:
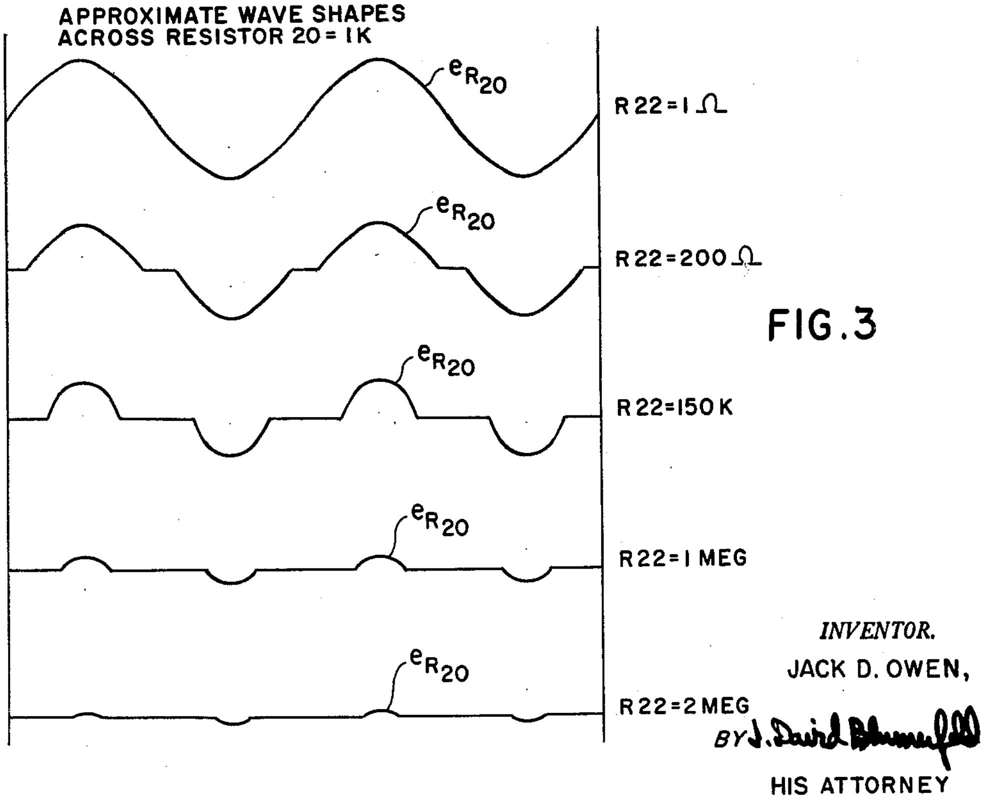
FIG. 3 is a series of wave forms depicting the variations of the voltage across the load with various values of the control element resistance.

FIG. 3 illustrates the wave forms of the voltages developed across load 20, as these would be displayed on the cathode ray oscilloscope 24, for various values for the discharging resistance 22. The particular wave forms shown were obtained for a switching arrangement constructed to have supply voltage with a peak-to-peak value of 10 volts and a frequency of 1 kc. Capacitors 14 and 16 were 1 microfarad capacitors, and the discharge resistance 22 was varied through discrete values of 1 ohm, 200 ohms, 150 k., 1 megohm, and 2 megohms. It is readily apparent from the wave forms of FIG. 3 that if resistance 22 is small, i.e., the R-C time constant is small relative to the period of one alternation of the supply voltage, the wave form across load 20 is a relatively faithful reproduction of the wave form of supply voltage from source 10. If, on the other hand, resistance 22 is chosen to have a very high value, the voltage developed across load 20 is reduced in amplitude and its wave form is distorted. That is, as resistance 22 increases, therby correspondingly increasing the time constant of the circuit, capacitors 14 and 16 are only partially discharged during each supply voltage alternation. This, of course, establishes a residual bias level $V_B$ which is less than the peak value of the supply voltage but greater than zero. Diodes 12 and 18 therefore conduct only after the amplitude of the supply voltage alternation is greater than the residual bias voltage $V_B$. If resistance 22 is very large, in the order of several megohms, the time constant of the circuit is sufficiently large that capacitors 14 and 16 are hardly discharged during the supply voltage alternations and the bias voltage $V_B$ on capacitor 16 approaches the peak-to-peak value of the supply voltage and that on capacitor 14 one-half of that value. Passage of the supply voltage to load 20 is, therefore, substantially prevented. With the circuit of FIG. 2, voltage level changes across the load of 70 db are realized.

Figure 4:
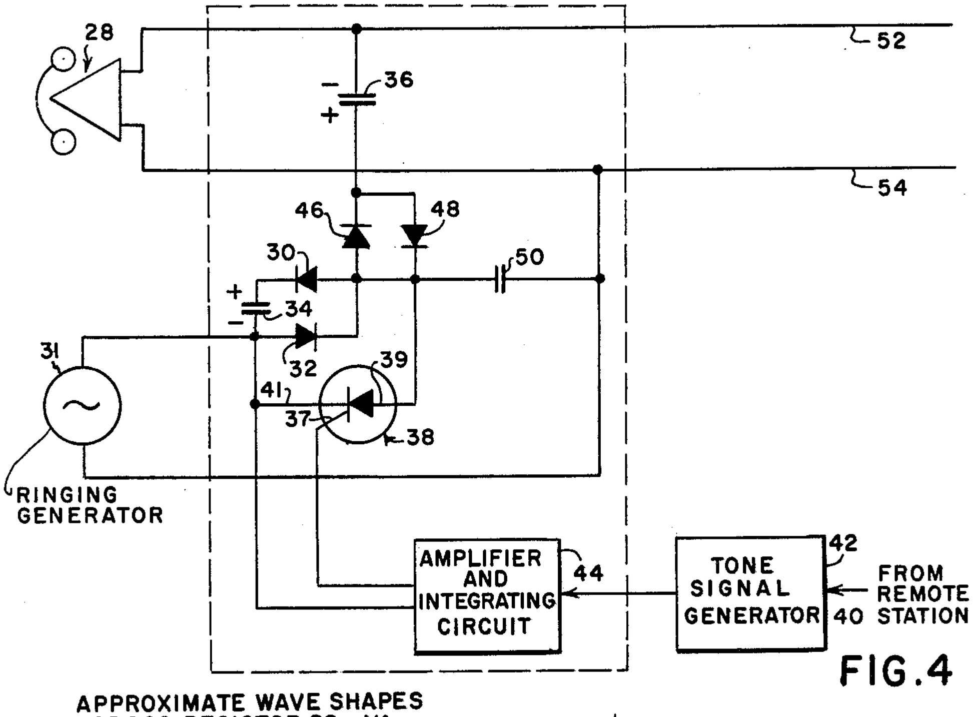
FIG. 4 illustrates, partially in block diagram form, a "ringdown circuit" incorporating the A.C. static switch.

FIG. 4 illustrates a static "ringdown" circuit incorporating a more sophisticated version of the static switch illustrated in FIGS. 1 and 2. Diodes 30 and 32 and capacitors 34 and 36 are connected in the same manner and serve the same functions as rectifiers 12 and 18 and capacitors 14 and 16, respectively, of the circuits of FIGS. 1 and 2, with a capacitor 36 being connected to one side of the common transmission line illustrated by conductors 52–54. A controlled unidirectional conducting device, such as a silicon controlled rectifier (SCR) 38, is connected between the anode-cathode junction of diodes 30 and 32 and the junction of capacitor 34 and the anode of diode 32. Rectifier 38 is utilized as the variable resistance control element to provide a supplemental conducting path for capacitors 34 and 36.

The conductivity of SCR 38, which includes an anode 39, a cathode 41 and gate electrode 37, is controlled in response to a coded call signal, transmitted from a remote station 40; a code which may take the form of any combination of spaced "long" and "short" pulses. The coded pulse signals are applied to a tone signal generator 42 which provides a sinusoidal output of a given frequency during the code interval. The frequency of the output signal is substantially greater than the frequency of the supply source voltage and is applied to an amplifier and integrating circuit 44. Amplifier and integrating circuit 44 converts the tone signal to unidirectional pulses which are applied to gate electrode 37 of SCR 38 to control its conductivity.

Silicon controlled rectifier 38 is a PNPN semiconductor consisting of three rectifying junctions having anode, cathode and gate electrodes. With reverse voltage impressed across the cathode and anode (i.e., the cathode is positive relative to the anode), the controlled rectifier blocks the flow of current. With a forward voltage applied (i.e., the anode is positive relative to the cathode), the controlled rectifier also blocks the flow of current up to a "breakover" point which is generally referred to as $V_{BO}$. At this breakover point, the blocking resistance of the controlled rectifier decreases almost instantaneously to a very low value and current flow is then limited only by the external voltage and circuit impedance. At anode-to-cathode voltages of less than $V_{BO}$, the controlled rectifier can be switched into the high conduction state by the application of a low level gate-to-cathode current. The controlled rectifier can be "turned off," and returned to the nonconducting state by reducing the flow of anode cur-current to a value less than a "holding" value generally referred to as $I_H$. The latter can be accomplished by reducing the supply voltage to zero, as would be the case if an alternating (A.C.) supply voltage is connected across the anode and cathode, or by diverting anode current around the controlled rectifier for the few micro-seconds required for the device to cover its nonconducting or blocking state.

The positive unidirectional pulses applied to gate electrode 37 from integrating circuit 44, accordingly, pulse silicon controlled rectifier 38 which provides a very low impedance discharge path to remove the biasing voltages accumulated across capacitors 34 and 36.

Diodes 46 and 48 as well as capacitor 50 are incorporated in the "ringdown" circuit of FIG. 4 to block or filter out any leakage current that might get into the common transmission line, represented by the conductors 52–54, during non-ringing conditions. That is, since ringing generator 31 is free-running, some means must be provided to prevent any leakage current from finding its way into the transmission line during the period when intelligence is being transmitted along the medium and when no coded ringing signals are present.

The ringing generator source 31 may suitably be a 20 cycle per second ringing generator, the tone signal generator may be a 3825 cycle oscillator. The load for the static switch, illustrated schematically as a subscriber telephone 28, is coupled to the transmission line 52–54, and which includes a "ringer" mechanism which is actuated in response to the ringing current from the generator 31.

The operation of the "ringdown" circuit illustrated in FIG. 4 may best be understood while keeping in mind the discussions had in connection with the circuits of FIGS. 1 and 2. Diodes 30 and 32 and capacitors 34 and 36 function as described in respect to FIGS. 1 and 2. During the first few cycles of the voltage from the ringing generator 31, diodes 30 and 32 are rendered nonconductive by virtue of the fact that capacitor 34 charges up to substantially the peak-to-peak value of the supply voltage from ringing generator 31 and capacitor 36 charges up to approximately one-half of this value. Thus, the ringing signal is blocked from common transmission line 52–54 and station telephone 28. When a positive gating pulse from circuit 44 is applied to gate electrode 37 of SCR 38, an event which occurs whenever the coded calling signals are applied to the tone signal generator 42, controlled rectifier 38 is switched to the conducting state. Capacitors 34 and 36 are discharged and the ringing signal is passed to two wire transmission line 52–54 and thence to station 28, where it actuates an electromechanical "ringer" to produce an audible pulsed ringing signal.

While a particular embodiment of this invention has been shown, it will, of course, be understood that it is not limited thereto since many modifications, both in the circuit arrangement and in the instrumentalities employed, may be made. It is contemplated by the appended claims to cover any such modifications as fall within the true spirit and scope of this invention.

What is claimed as new and desired to be secured by Letters Patent is:

1. In combination, an alternating current potential source, a pair of oppositely poled rectifiers, a first capacitance connected between one set of opposite electrodes of said rectifiers, a load, a second capacitance connected in series between said load and the junction of the other set of opposite terminals of said rectifiers whereby said rectifiers are biased to nonconductivity upon the application thereto of potential from said source and substantially no current flows through said load, and means in circuit with said rectifiers and capacitances for statically controlling said biasing in response to an external control signal thereby applying the alternating signal from said source to said load.

2. In combination, an alternating current potential source, a pair of oppositely poled rectifiers, a first capacitance connected between one set of opposite electrodes of said rectifiers, a load, a second capacitance connected in series between said load and the junction of the other set of opposite electrodes of said rectifiers and means in circuit with the combination of said rectifiers and capacitances for providing a discharge path for said capacitances in response to an external control signal for selectively controlling the biasing of said rectifiers thereby applying the alternating signal from said source to said load.

3. In the combination of claim 2 wherein said control means is connected across said first capacitance.

4. In the combination of claim 2 wherein said control means is connected across the rectifier which is forward biased with respect to said A.C. source.

5. In the combination of claim 2 wherein said control means is connected between said first capacitance and said load.

6. In the combination of claim 2 wherein said control means is a resistance.

7. In the combination of claim 2 wherein said control means is a feedback device.

8. In the combination of claim 2 wherein said control means is a controlled rectifier.

9. A ringdown circuit for a telephone line including a ringing generator; an arrangement comprising a pair of oppositely poled parallel connected rectifiers, a first capacitance connected across one set of opposite electrodes of said rectifiers, a second capacitance connected in series between said line and the junction of the other set of opposite electrodes of said rectifiers said capacitances being charged to a polarity such that said rectifiers are biased into their nonconducting states; a controlled rectifier comprising an anode, a cathode, and a gate electrode connected across the rectifier which is forward biased with respect to said A.C. source, and means for pulsing said gate electrode, whereby said ringing generator is opened and closed across said line at the rate of said pulsing.

10. A ringdown circuit as defined in claim 9 and further including filter means in circuit with said arrangement.

References Cited in the file of this patent

UNITED STATES PATENTS

| | | |
|---|---|---|
| 2,824,175 | Meacham | Feb. 18, 1958 |
| 2,830,128 | Radcliff et al. | Apr. 8, 1958 |
| 2,957,950 | Holman et al. | Oct. 25, 1960 |
| 2,959,691 | Zoerner et al. | Nov. 8, 1960 |
| 2,998,487 | Hilbourne | Aug. 29, 1961 |